United States Patent
Endo et al.

(10) Patent No.: US 11,000,811 B2
(45) Date of Patent: May 11, 2021

(54) REVERSE OSMOSIS COMPOSITE MEMBRANE AND METHOD FOR MANUFACTURING REVERSE OSMOSIS COMPOSITE MEMBRANE

(71) Applicant: SHINSHU UNIVERSITY, Matsumoto (JP)

(72) Inventors: Morinobu Endo, Suzaka (JP); Toru Noguchi, Karuizawa-machi (JP); Shigeki Inukai, Nagano (JP)

(73) Assignee: SHINSHU UNIVERSITY, Nagano (JP)

( * ) Notice: Subject to any disclaimer, the term of this patent is extended or adjusted under 35 U.S.C. 154(b) by 118 days.

(21) Appl. No.: 16/405,456

(22) Filed: May 7, 2019

(65) Prior Publication Data
US 2019/0321788 A1 Oct. 24, 2019

Related U.S. Application Data

(62) Division of application No. 15/555,916, filed as application No. PCT/JP2016/060216 on Mar. 29, 2016, now Pat. No. 10,376,847.

(30) Foreign Application Priority Data

Mar. 31, 2015 (JP) .............................. JP2015-073462

(51) Int. Cl.
*B01D 71/56* (2006.01)
*B01D 67/00* (2006.01)
(Continued)

(52) U.S. Cl.
CPC ......... *B01D 69/148* (2013.01); *B01D 61/025* (2013.01); *B01D 67/0006* (2013.01);
(Continued)

(58) Field of Classification Search
CPC .............. B01D 69/148; B01D 67/0006; B01D 67/0079; B01D 61/025; B01D 69/02;
(Continued)

(56) References Cited

U.S. PATENT DOCUMENTS

| 2006/0029537 A1* | 2/2006 | Zhang | ..................... | B82Y 30/00 |
| | | | | 423/447.1 |
| 2008/0023396 A1* | 1/2008 | Fugetsu | ................ | C01B 32/156 |
| | | | | 210/502.1 |

(Continued)

FOREIGN PATENT DOCUMENTS

| CN | 102164659 A | 8/2011 |
| CN | 103124590 A | 5/2013 |

(Continued)

OTHER PUBLICATIONS

Torrey Hill Technologies (Nov. 19, 2003 online) https://web.archive.org/web/20131119013123/https://www.threerollmill.com/nanomill.html (Year: 2013).*

(Continued)

*Primary Examiner* — Pamela H Weiss
(74) *Attorney, Agent, or Firm* — Oliff PLC

(57) ABSTRACT

A method of manufacturing a reverse osmosis composite membrane, including: (i) bringing a mixed liquid containing carbon nanotubes, water, and an amine component into contact with a porous support, the mixed liquid being produced through a step of pressurizing and compressing an aqueous solution containing the carbon nanotubes while flowing the aqueous solution, followed by releasing or reducing a pressure to return a volume of the aqueous solution to an original volume to mix the carbon nanotubes; and then (ii) subjecting the amine component in the mixed liquid adhering to the porous support to a crosslinking reaction.

10 Claims, 12 Drawing Sheets

(51) Int. Cl.
*B01D 61/02* (2006.01)
*B01D 69/12* (2006.01)
*B01D 71/02* (2006.01)
*B01D 69/14* (2006.01)
*B01D 69/02* (2006.01)

(52) U.S. Cl.
CPC ......... *B01D 67/0079* (2013.01); *B01D 69/02* (2013.01); *B01D 69/125* (2013.01); *B01D 71/021* (2013.01); *B01D 71/56* (2013.01); *B01D 2323/40* (2013.01); *B01D 2325/20* (2013.01)

(58) Field of Classification Search
CPC .... B01D 69/125; B01D 71/021; B01D 71/56; B01D 2323/40; B01D 2325/20
See application file for complete search history.

(56) References Cited

U.S. PATENT DOCUMENTS

| | | | |
|---|---|---|---|
| 2009/0283475 A1* | 11/2009 | Hylton | B82Y 30/00 210/644 |
| 2009/0321355 A1 | 12/2009 | Ratto et al. | |
| 2010/0025330 A1 | 2/2010 | Ratto et al. | |
| 2012/0080380 A1* | 4/2012 | Wang | B01D 69/148 210/654 |
| 2012/0080381 A1* | 4/2012 | Wang | C09D 7/61 210/654 |
| 2012/0183770 A1 | 7/2012 | Bosnyak et al. | |
| 2016/0051940 A1 | 2/2016 | Park et al. | |

FOREIGN PATENT DOCUMENTS

| | | |
|---|---|---|
| JP | 2009-242145 A | 10/2009 |
| JP | 2011-526834 A | 10/2011 |
| JP | 2014-500131 A | 1/2014 |
| JP | 2016-517795 A | 6/2016 |
| WO | 2010/002805 A1 | 1/2010 |
| WO | 2012/047359 A1 | 4/2012 |
| WO | 2014/168366 A1 | 10/2014 |

OTHER PUBLICATIONS

High Performance Reverse Osmosis NanoComposite Membranes Containing Mixture of carbon nanotubes and graphene oxides Hee Joong Kim, Min-YOung, Lim, Kyung Hwa Jung, Dong-Gyun Kim, Jong_Chan Lee (published Dec. 16, 2014) J Mater. Chem A (2015) 6789-6809 (Year: 2014).*
Preferred orientation and anisotropic transport properties J E Fischer, W Zhou, J Vavro M C Liaguno, C Guthy, and R Haggenmueller, M J Casavant, DE Walters, and RE Smally Journal of Applied Physics vol. 93 No. 4, Feb. 15, 2003 (Year: 2003).*
Aug. 10, 2020 Office Action issued in Chinese Patent Application No. 201680016117.6.
Dec. 31, 2019 Office Action issued in Chinese Patent Application No. 201680016117.6.
Kim et al. "High-Performance Reverse Osmosis CNT/Polyamide Nanocomposite Membrane by Controlled Interfacial Interactions," ACS Applied Materials & Interfaces, vol. 6, pp. 2819-2829, 2014.
Lee et al. "Experimental Evidence of Rapid Water Transport through Carbon Nanotubes Embedded in Polymeric Desalination Membranes," Small, vol. 10, No. 13, pp. 2653-2660, 2014.
Zhao et al. "Improving the Performance of Polyamide Reverse Osmosis Membrane by Incorporation of Modified Multi-walled Carbon Nanotubes", Journal of Membrane Science, vol. 450, pp. 249-256, 2014.
Jun. 21, 2016 International Search Report issued in International Patent Application No. PCT/JP2016/060216.
May 2, 2018 Office Action issued in Japanese Patent Application No. 2017-510045.
Mar. 11, 2019 Office Action issued in U.S. Appl. No. 15/555,916.

* cited by examiner

REVERSE OSMOSIS COMPOSITE MEMBRANE AND METHOD FOR MANUFACTURING REVERSE OSMOSIS COMPOSITE MEMBRANE

CROSS-REFERENCE TO RELATED APPLICATIONS

This application is a Division of application Ser. No. 15/555,916 filed Sep. 5, 2017, which in turn is a national stage entry of PCT/JP2016/060216 filed Mar. 29, 2016, which claims priority to Japanese Patent Application No. 2015-073462 filed Mar. 31, 2015. The disclosure of each of the prior applications is hereby incorporated by reference herein in its entirety.

TECHNICAL FIELD

The present invention relates to a reverse osmosis composite membrane using carbon nanotubes and a method of manufacturing the membrane.

BACKGROUND ART

In order to cope with global water shortage and water contamination, a water treatment technology involving using a reverse osmosis membrane (RO membrane) has been attracting attention. Of such membranes, a reverse osmosis membrane using an aromatic polyamide that can remove even an ion component, such as salt, with a pore diameter of 1 nm or less has been most widely spread in seawater desalination plants.

In a water treatment involving utilizing a reverse osmosis membrane, a permeate flux and desalination performance (NaCl rejection rate) reduce with time owing to the adhesion of dirt to the reverse osmosis membrane. Accordingly, the permeate flux and the desalination performance needs to be restored by periodically washing the reverse osmosis membrane. A washing method desired for the washing of the reverse osmosis membrane is washing with an aqueous solution containing a hypochlorite or active chlorine having an oxidizing power because the washing is excellent in decomposing and removing properties for a protein component and the like, microbicidal property, and sterilizing property.

However, the reverse osmosis membrane using the aromatic polyamide has low resistance to chlorine having an oxidizing power, and hence a portion in contact with chlorine deteriorates. Accordingly, the membrane involves a problem in that its desalination performance extremely reduces after washing with oxidizing chlorine relative to that before the washing.

Reverse osmosis membranes using carbon nanotubes have also been proposed (Non Patent Literatures 1 to 3). However, each of the proposals is inferior in performance to a reverse osmosis membrane currently available on the market, and shows no dramatic improvement in chlorine resistance.

CITATION LIST

Non Patent Literature

NPL 1: Hee Joong Kim and seven others, "High-Performance Reverse Osmosis CNT/Polyamide Nanocomposite Membrane by Controlled Interfacial Interactions," *ACS Appl. Mater. Interfaces* 2014, 6, 2819-2829

NPL 2: Hee Dae Lee and three others, "Experimental Evidence of Rapid Water Transport through Carbon Nanotubes Embedded in Polymeric Desalination Membranes," *Small, Volume* 10, Issue 13, pages 2653-2660, Jul. 9, 2014

NPL 3: Haiyang Zhao and five others, "Improving the performance of polyamide reverse osmosis membrane by incorporation of modified multi-walled carbon nanotubes" *Journal of Membrane Science,* 450, 2014, 249-256

SUMMARY OF INVENTION

Technical Problem

In view of the foregoing, an object of the present invention is to provide a reverse osmosis composite membrane excellent in chlorine resistance and a method of manufacturing the reverse osmosis composite membrane.

Solution to Problem

Application Example 1

A reverse osmosis composite membrane according to this Application Example includes:

a porous support; and a reverse osmosis membrane arranged on the porous support and containing a crosslinked polyamide and carbon nanotubes, the reverse osmosis membrane containing disentangled carbon nanotubes in the crosslinked polyamide;

a distribution of closest distances between the carbon nanotubes in the reverse osmosis membrane having a peak that is within a range of a thickness of the reverse osmosis membrane; and a half-width of the peak being equal to or less than the thickness of the reverse osmosis membrane.

Application Example 2

In the above reverse osmosis composite membrane, the disentangled carbon nanotubes may form a continuous three-dimensional structure through the crosslinked polyamide.

Application Example 3

In the above reverse osmosis composite membrane, the crosslinked polyamide may be a crosslinked aromatic polyamide; and the reverse osmosis membrane may contain a molecularly-oriented crosslinked aromatic polyamide configured to cover the carbon nanotubes.

Application Example 4

In the above reverse osmosis composite membrane, a content of the carbon nanotubes in the reverse osmosis membrane may be 5 mass % or more and 30 mass % or less.

Application Example 5

In the above reverse osmosis composite membrane, the distribution may be a normal distribution.

Application Example 6

In the above reverse osmosis composite membrane, the carbon nanotubes may have an average diameter of 5 nm or more and 30 nm or less.

Application Example 7

In the above reverse osmosis composite membrane, the molecularly-oriented crosslinked aromatic polyamide may form a layer on a surface of each of the carbon nanotubes, the layer having a thickness of 1 nm or more and 50 nm or less.

Application Example 8

In the above reverse osmosis composite membrane, the reverse osmosis composite membrane may have a permeate flux of 0.8 $m^3/(m^2 \cdot day \cdot MPa)$ or more and a NaCl rejection rate of 95% or more when an aqueous solution of NaCl having a pH of 7, a temperature of 23° C., and a concentration of 2,000 ppm is supplied at an operating pressure of 1.55 MPa; and the reverse osmosis composite membrane may have a reduction rate of the NaCl rejection rate of less than 10% after having been immersed in an aqueous solution of sodium hypochlorite having a pH of 9±0.5, a temperature of 23° C., and a concentration of 200 ppm for 24 hours.

Application Example 9

In the above reverse osmosis composite membrane, the reverse osmosis composite membrane may have a reduction rate of a permeate flux of less than 35% after having been brought into contact with an aqueous solution containing bovine serum albumin at a concentration of 200 ppm for 72 hours.

Application Example 10

A method of manufacturing a reverse osmosis composite membrane according to this Application Example includes:

bringing a mixed liquid containing carbon nanotubes, water, and an amine component into contact with a porous support; and then subjecting the amine component in the mixed liquid adhering to the porous support to a crosslinking reaction, the mixed liquid being produced through a step of pressurizing and compressing an aqueous solution containing the carbon nanotubes while flowing the aqueous solution, followed by release or reduction of a pressure to return a volume of the aqueous solution to an original volume to mix the carbon nanotubes.

Application Example 11

In the above method of manufacturing a reverse osmosis composite membrane, a content of the amine component in the mixed liquid may be 1.0 mass % or more and 3.0 mass % or less; and a content of the carbon nanotubes in the mixed liquid may be 0.11 mass % or more and 1.3 mass % or less.

Application Example 12

In the above method of manufacturing a reverse osmosis composite membrane, the amine component may be an aromatic amine.

Application Example 13

In the above method of manufacturing a reverse osmosis composite membrane, the aqueous solution containing the carbon nanotubes may further contain a surfactant.

Advantageous Effects of Invention

The reverse osmosis composite membrane according to the present invention enables washing with an aqueous solution containing oxidizing chlorine. In addition, the method of manufacturing a reverse osmosis composite membrane according to the present invention enables the manufacture of a reverse osmosis composite membrane that can be washed with an aqueous solution containing oxidizing chlorine.

DESCRIPTION OF EMBODIMENTS

Embodiments of the present invention are described in detail below with reference to the drawings.

A. Reverse Osmosis Composite Membrane

A reverse osmosis composite membrane according to one embodiment of the present invention includes: a porous support; and a reverse osmosis membrane arranged on the porous support, the reverse osmosis membrane containing a crosslinked polyamide and carbon nanotubes. The reverse osmosis membrane contains disentangled carbon nanotubes in the crosslinked polyamide. A distribution of closest distances between the carbon nanotubes in the reverse osmosis membrane has a peak within a range of a thickness of the reverse osmosis membrane, and a half-width of the peak is equal to or less than the thickness of the reverse osmosis membrane.

Figure 1:
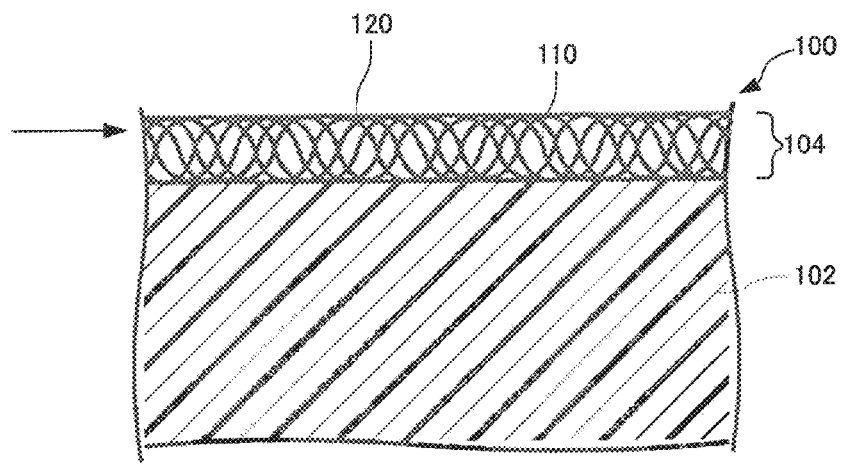
FIG. 1 is a longitudinal sectional view for schematically illustrating a reverse osmosis composite membrane 100.

FIG. 1 is a longitudinal sectional view for schematically illustrating a reverse osmosis composite membrane 100.

In the reverse osmosis composite membrane 100, a reverse osmosis membrane 104 is arranged on a porous support 102. At least one surface of the porous support 102 is covered with the reverse osmosis membrane 104. The reverse osmosis membrane 104 contains a crosslinked polyamide 120 (description is given below by taking a crosslinked aromatic polyamide as an example, but the polyamide is not limited thereto) and carbon nanotubes 110. The entirety of the surface (observed with a microscope) of the reverse osmosis membrane 104 is covered with the crosslinked aromatic polyamide 120.

The reverse osmosis membrane 104 contains the disentangled carbon nanotubes 110 in the crosslinked aromatic polyamide 120. The crosslinked aromatic polyamide 120 serves as a matrix, and a gap between the disentangled carbon nanotubes 110 adjacent to each other is filled with the crosslinked aromatic polyamide 120. Raw materials for the carbon nanotubes are typically in such an aggregate state as to be brought into contact with each other by an intermolecular force, thereby forming an agglomerate. However, the carbon nanotubes are disentangled from the agglomerate by a step to be described later, and hence the carbon nanotubes 110 are brought into such a disentangled state as to be dispersed in the crosslinked aromatic polyamide 120. The fact that the carbon nanotubes 110 are disentangled in the crosslinked aromatic polyamide 120 may be confirmed by the distribution of closest distances between the carbon nanotubes 110 in the reverse osmosis membrane 104.

The closest distances between the carbon nanotubes may be measured by observation with a scanning electron microscope. Specifically, a thin film-like test piece in which the surface of the reverse osmosis membrane 104 is turned into a smooth surface is cut out through cutting along the surface of the reverse osmosis composite membrane 100 by a cryo-microtome method (e.g., cutting at a position indicated by the arrow illustrated in the left side of FIG. 1), and the smooth surface (reverse osmosis membrane 104) of the test piece is observed with the scanning electron microscope.

Figure 2:
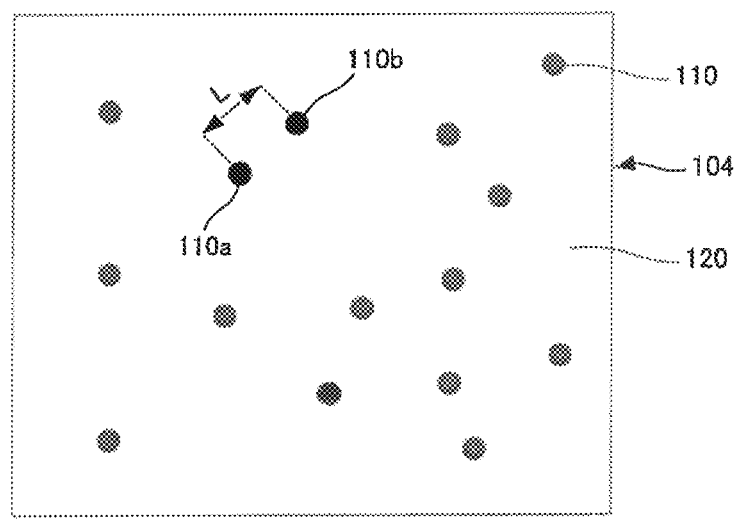
FIG. 2 is a plan view for schematically illustrating a smooth surface of a reverse osmosis membrane 104 observed with a scanning electron microscope.

FIG. 2 is a plan view for schematically illustrating the smooth surface of the reverse osmosis membrane 104 observed with the scanning electron microscope. When the smooth surface of the reverse osmosis membrane 104 is observed with the scanning electron microscope, the cut portions of the carbon nanotubes 110 scattered in the crosslinked aromatic polyamide 120 are found as illustrated in FIG. 2. In FIG. 2, the cut portions of the carbon nanotubes 110 are illustrated by black points. In the reverse osmosis membrane 104, the closest distances between the carbon nanotubes are each measured not as an interval between the surfaces of the carbon nanotubes but as a distance between the centers of the cut surfaces of the carbon nanotubes.

A method of measuring the closest distances is specifically described with reference to FIG. 2.

First, such an image of the smooth surface of the reverse osmosis membrane 104 photographed with the scanning electron microscope as illustrated in FIG. 2 is captured in a computer.

Next, a measurer displays the image on the screen of the computer, and acquires coordinates on the image for each of the cut portions of a predetermined number (20,000) of the carbon nanotubes 110 illustrated by black points in FIG. 2 present in a predetermined area (a measurement area of 441 $\mu m^2$).

Next, when the coordinates of a predetermined number of black points close to each other are acquired, any other black point at the closest distance from each black point is found, and a distance between the two points is determined for each black point. For example, the coordinates of a black point at a position closest to the coordinates of a carbon nanotube 110a in FIG. 2 out of a plurality of black points present around the carbon nanotube 110a are the coordinates of a carbon nanotube 110b, and a distance between the two points is a closest distance L in the carbon nanotube 110a. The operation of determining the closest distance L from the distance between the two points is performed for each black point. The operation of finding the coordinates of any other black point closest from the coordinates of a black point in the image, the operation of measuring a distance between the two points, and the operation of determining the closest distance L may be automatically analyzed and processed with the computer.

The distribution of the closest distances between the carbon nanotubes 110 is created from the measurement results as a graph in which the results are plotted against an axis of abscissa indicating a closest distance (nm) and an axis of ordinate indicating the number of measurement points (frequency). A measurement area and the number of measurement points in the test piece are 441 $\mu m^2$ and 20,000, respectively. When the measurement area and the number of measurement points in the test piece are 200 $\mu m^2$ or more and 10,000 or more, respectively, and the carbon nanotubes 110 close to each other are subjected to the measurement without omission, a distribution with which whether or not the carbon nanotubes 110 are disentangled can be judged can be obtained. However, it is suitable that the measurement area be 400 $\mu m^2$ or more, and the number of measurement points be 20,000 or more.

In the present invention, a state in which the carbon nanotubes 110 in the reverse osmosis membrane 104 are disentangled is a state in which the distribution of the closest distances between the carbon nanotubes 110 in the reverse osmosis membrane 104 shows a peak within the range of the thickness of the reverse osmosis membrane 104, and the half-width of the peak is equal to or less than the thickness of the reverse osmosis membrane 104.

Figure 3:
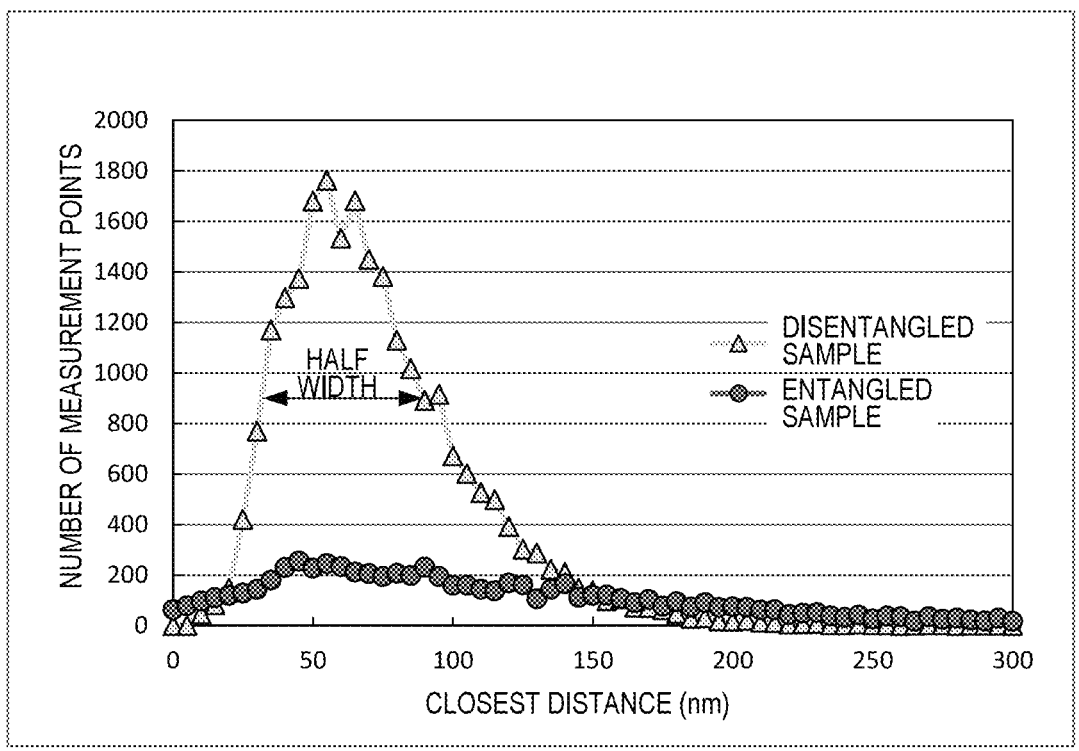
FIG. 3 is a graph for illustrating the distribution of closest distances between carbon nanotubes.

The distribution of the closest distances between the carbon nanotubes is described with reference to FIG. 3. FIG. 3 is a graph for illustrating an example of the distribution of the closest distances between the carbon nanotubes, and the measurement of the distribution was made on the disentangled carbon nanotubes. A sample (disentangled sample) in which the carbon nanotubes are disentangled used in the measurement is a test piece cut out of a reverse osmosis membrane produced under the conditions of Example 1 to be described later. As illustrated in FIG. 3, the distribution of the closest distances between the disentangled carbon nanotubes has a peak within the range of the thickness (e.g., 100 nm) of the reverse osmosis membrane as represented by triangle marks. In addition, the half-width of the peak is equal to or less than the thickness of the reverse osmosis membrane. In addition, the distribution of the closest distances between the disentangled carbon nanotubes is a normal distribution. When the carbon nanotubes are not sufficiently disentangled and hence an agglomerate of the carbon nanotubes is present, as represented by circle marks in FIG. 3, the distribution of closest distances therebetween does not have any clear peak within the range of the thickness of the reverse osmosis membrane, and does not show any normal distribution. In the example illustrated in FIG. 3, a sample (entangled sample) in which an agglomerate is present and carbon nanotubes are not disentangled is a test piece cut out of a reverse osmosis membrane produced under the conditions of Comparative Example 2 to be described later. An interval between carbon nanotubes in an agglomerate (in the description of the present application, the term "agglomerate" refers to an agglomerate having a maximum diameter of 50 nm or more) cannot be measured. This is because when the reverse osmosis membrane 104 is cut by a cryo-microtome method, the membrane is cut while an agglomerate is avoided, and hence no agglomerate can be observed on a smooth surface of the membrane.

The measurement results of FIG. 3 are obtained by performing the measurement after cutting out a thin film-like test piece in which the surface of the reverse osmosis membrane 104 is turned into a smooth surface as illustrated in FIG. 1. However, even when the reverse osmosis membrane 104 is cut in its thickness direction and the resultant section is subjected to the measurement, a similar distribution is basically obtained. This is because the carbon nanotubes 110 are distributed in a substantially three-dimensionally isotropic manner.

In the reverse osmosis membrane containing the disentangled carbon nanotubes, the carbon nanotubes are dispersed at a relatively high concentration (high blending ratio), and hence the closest distances between the carbon nanotubes seldom become larger than the thickness of the reverse osmosis membrane. Most of the closest distances between the carbon nanotubes are equal to or less than the thickness of the reverse osmosis membrane, and hence the half-width of the peak in the distribution of the closest distances is equal to or less than the thickness of the reverse osmosis membrane, and the position of the peak falls within the range of the thickness of the reverse osmosis membrane.

In addition, when the carbon nanotubes are not disentangled, an agglomerate occurs, and hence in a site where no agglomerate is present, the concentration of the carbon nanotubes is low and the carbon nanotubes are widely dispersed. Accordingly, many closest distances equal to or more than the thickness of the reverse osmosis membrane are present, and hence a wide distribution like that of the entangled sample of FIG. 3 is obtained and the number of such measurement points that closest distances therebetween are equal to or less than the thickness of the reverse osmosis membrane is small.

The distribution of the closest distances between the carbon nanotubes in the reverse osmosis membrane may be such a normal distribution as illustrated in FIG. 3. This is because when the carbon nanotubes in the reverse osmosis membrane are disentangled, the variability of the distribution of the closest distances becomes smaller and hence the distribution of the closest distances between the carbon nanotubes shows a normal distribution. The term "normal distribution" as used herein also includes a distribution approximate to the normal distribution. In addition, the distribution of the closest distances between the carbon nanotubes in the reverse osmosis membrane may be a Poisson distribution or a Lorentz distribution.

The experience of the measurement of the samples of Examples has shown that the closest distances of a sample in which carbon nanotubes are disentangled show a normal distribution having a mean of 20 nm or more and 80 nm or less, and a standard deviation a of 20 nm or more and 75 nm or less.

In such a graph showing the distribution of the closest distances between the carbon nanotubes as illustrated in FIG. 3, as the concentration of the carbon nanotubes in the reverse osmosis membrane becomes higher, the peak to appear shifts to a left side; in contrast, as the concentration of the carbon nanotubes becomes lower, the peak to appear shifts to a right side.

Next, a three-dimensional structure is described. As illustrated in FIG. 1, in the reverse osmosis membrane 104, the disentangled carbon nanotubes 110 can form a three-dimensional structure through the crosslinked aromatic polyamide. The term "three-dimensional structure" refers to a structure in which the carbon nanotubes 110 dispersed in the crosslinked aromatic polyamide of the reverse osmosis membrane 104 are connected to each other at a portion where the nanotubes intersect each other through the crosslinked aromatic polyamide to be three-dimensionally continuous. In other words, the three-dimensional structure may be paraphrased as a structure in which the carbon nanotubes 110 are formed into a three-dimensionally spreading network. The crosslinked aromatic polyamide adheres to the surfaces of the carbon nanotubes 110 in the three-dimensional structure, and in a portion where the carbon nanotubes 110 are connected to each other, the carbon nanotubes 110 are close to each other while being distant from each other by the thickness of the crosslinked aromatic polyamide adhering to the nanotubes. When the many disentangled carbon nanotubes 110 are dispersed in the entirety of the reverse osmosis membrane 104, the three-dimensional structure forms a steric continuous structure in the entirety of the membrane.

Figure 4:
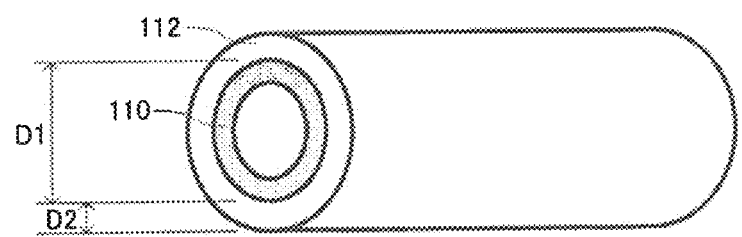
FIG. 4 is a schematic diagram of a carbon nanotube 110 in the reverse osmosis membrane 104.

Next, molecular orientation is described. FIG. 4 is a view for schematically illustrating the carbon nanotube 110 in the reverse osmosis membrane 104. The carbon nanotube 110 in the reverse osmosis membrane 104 may include a molecularly-oriented crosslinked aromatic polyamide layer 112 configured to cover its surface. The crosslinked aromatic polyamide in contact with, or close to, the disentangled carbon nanotubes 110 may be molecularly oriented. When the molecularly-oriented crosslinked aromatic polyamide layer 112 is formed so as to cover the carbon nanotube 110, the crosslinked aromatic polyamide layer 112 is mechanically reinforced by the carbon nanotube 110, and hence the peel strength of the crosslinked aromatic polyamide layer 112 to the carbon nanotube 110 is improved. Further, when the content of the carbon nanotubes 110 increases, the crosslinked aromatic polyamide layers 112 that are in contact with, or close to, the carbon nanotubes 110 to be molecularly oriented approach or overlap each other. Then, the volume of the molecularly-oriented crosslinked aromatic polyamide layers 112 in the entirety of the reverse osmosis membrane 104 increases, and as a result, mechanical strength and chemical resistance in the reverse osmosis membrane 104 are improved. As a result, peeling resistance and oxidation resistance can be enhanced while the reverse osmosis composite membrane 100 (FIG. 1) has high desalination performance. Here, the term "peeling resistance" means that the crosslinked aromatic polyamide layer 112 hardly peels from the carbon nanotube 110, and the term "oxidation resistance" means difficulty in deterioration by oxidizing chlorine, i.e., chlorine resistance. In order that the crosslinked aromatic polyamide layer 112 may be necessarily in a state of being adjacent to a carbon nanotube in the reverse osmosis membrane 104, in the case of, for example, the carbon nanotubes 110 having an average diameter of 5 nm or more and 30 nm or less, their content is desirably 10 mass % or more.

Under such content of the carbon nanotubes, even when the crosslinked aromatic polyamide that is not molecularly oriented, which is present between the crosslinked aromatic polyamide layers 112 adjacent to each other, slightly remains in the reverse osmosis membrane 104, the portion that is not molecularly oriented and the molecularly-oriented crosslinked aromatic polyamide layers 112 are integrated and are hence mechanically reinforced. Accordingly, the entirety of the membrane may be able to have relatively high chlorine resistance.

The molecular orientation of the crosslinked aromatic polyamide layer 112 may be confirmed by subjecting the reverse osmosis membrane 104 to electron diffraction analysis with a transmission electron microscope.

As is apparent from the foregoing description, a state in which the distribution of the closest distances L of the carbon nanotubes 110 has a peak within the range of the thickness of the reverse osmosis membrane 104 (FIG. 3) is a state in which the carbon nanotubes 110 are arranged so as to be close to each other in any place of the reverse osmosis membrane 104. The carbon nanotubes 110 arranged so as to be close to each other are linked to each other by the molecularly-oriented crosslinked aromatic polyamide layers 112 (FIG. 4) to form a three-dimensional structure having high mechanical strength in the reverse osmosis membrane 104. The crosslinked aromatic polyamide layer 112 configured to cover the periphery of the carbon nanotube 110 may have high peeling resistance to the carbon nanotube 110. In addition, the molecularly-oriented crosslinked aromatic polyamide layers 112 are present in substantially the entirety of the reverse osmosis membrane 104 together with the carbon nanotubes 110, and hence the oxidation resistance (chlorine resistance) is enhanced while desalination performance exhibited by the crosslinked aromatic polyamide is secured.

It is desired that the reverse osmosis membrane 104 be substantially free of any agglomerate of the carbon nanotubes 110. When an agglomerate is present in the reverse osmosis membrane 104, the agglomerate portion serves as a structural defect to impair the strength of the membrane. In addition, the reverse osmosis membrane 104 having many agglomerates is liable to be deteriorated by washing with oxidizing chlorine because a region formed only of the crosslinked aromatic polyamide in which the carbon nanotubes 110 are not present, in particular a region formed of the crosslinked aromatic polyamide that is not molecularly oriented is widely present between an agglomerate and an adjacent agglomerate. Further, in the reverse osmosis membrane 104 having many agglomerates, the crosslinked aromatic polyamide does not enter any agglomerate, and hence the desalination performance is impaired.

The content of the carbon nanotubes 110 in the reverse osmosis membrane 104 illustrated in FIG. 1 may be 5 mass % or more and 30 mass % or less. Further, the content of the carbon nanotubes 110 in the reverse osmosis membrane 104 may be 10 mass % or more and 30 mass % or less, and in particular, may be 12.5 mass % or more and 30 mass % or less. When the content of the carbon nanotubes 110 in the reverse osmosis membrane 104 is 5 mass % or more, a three-dimensional structure can be formed in the entirety of the reverse osmosis membrane 104. In particular, when the content of the carbon nanotubes 110 in the reverse osmosis membrane 104 is 12.5 mass % or more, most of the closest distances L are equal to or less than the thickness of the reverse osmosis membrane 104. In addition, when the content of the carbon nanotubes 110 in the reverse osmosis membrane 104 is 30 mass % or less, the carbon nanotubes 110 can be covered with the aromatic polyamide.

The thickness of the reverse osmosis membrane 104 may be 50 nm or more and 1,000 nm or less, and may be 100 nm or more and 500 nm or less. When the thickness of the reverse osmosis membrane 104 is 50 nm or more, the three-dimensional structure of the carbon nanotubes 110 can be formed, and when the thickness is 1,000 nm or less, a practical permeate flux may be obtained.

The reverse osmosis composite membrane 100 can be used even at a relatively high operating pressure because the membrane is excellent in pressure resistance by virtue of a reinforcing effect exhibited by the three-dimensional structure of the carbon nanotubes 110. The fact that the operating pressure can be increased contributes to an increase in permeate flux.

Examples of the kinds of solutions to be separated with the reverse osmosis composite membrane 100 include high-concentration brine, seawater, and concentrated seawater (desalination).

The permeate flux, NaCl rejection rate, increase rate of the permeate flux, and reduction rate of the NaCl rejection rate of the reverse osmosis composite membrane 100 are described later.

A-1. Carbon Nanotubes

The average diameter (fiber diameter) of the carbon nanotubes may be 5 nm or more and 30 nm or less. The thickness of a commercial reverse osmosis composite membrane is 100 nm or more and 500 nm or less, and hence thin carbon nanotubes having an average diameter of 30 nm or less are preferred, and carbon nanotubes having an average diameter of 5 nm or more are preferred in terms of the ease of handling in a disentangling step to be described later.

In the detailed description of the present invention, the average diameter and average length of the carbon nanotubes may be obtained by: measuring diameters and lengths at 200 or more sites selected from an image photographed with an electron microscope at a magnification of, for example, 5,000 times (the magnification may be appropriately changed in accordance with the sizes of the carbon nanotubes); and calculating their arithmetic average values.

The carbon nanotubes may be subjected to, for example, an oxidation treatment in order that reactivity with a liquid at each of their surfaces may be improved.

The carbon nanotubes may be so-called carbon nanotubes each having a tubular shape obtained by winding one sheet surface (graphene sheet) of graphite having a carbon hexagonal net surface, and may be multi-walled carbon nanotubes (MWCNT).

The carbon nanotubes having an average diameter of 5 nm or more and 30 nm or less may be, for example, NC-7000 manufactured by Nanocyl.

A carbon material partially having a carbon nanotube structure may also be used. The carbon nanotubes may be called by the name of "graphite fibril nanotube" or "vapor-grown carbon fiber" in addition to the name of "carbon nanotube."

The carbon nanotubes may be obtained by chemical vapor deposition. The chemical vapor deposition is also referred to as "catalytic chemical vapor deposition (CCVD)," and is a method involving subjecting a gas, such as a hydrocarbon, to vapor-phase thermal cracking in the presence of a metal-based catalyst to manufacture the carbon nanotubes. The chemical vapor deposition is described in more detail. For example, there may be used a floating reaction method in which an organic compound, such as benzene or toluene, is used as a raw material, an organic transition metal compound, such as ferrocene or nickelocene, is used as a metal-based catalyst, and the compounds are introduced into a reaction furnace set at a reaction temperature as high as, for example, 400° C. or more and 1,000° C. or less together with a carrier gas to produce the carbon nanotubes in a floating state or on the wall of the reaction furnace, or a substrate reaction method in which metal-containing particles carried in advance on a ceramics, such as alumina or magnesium oxide, are brought into contact with a carbon-containing compound at high temperature to produce the carbon nanotubes on a substrate.

The carbon nanotubes having an average diameter of 5 nm or more and 30 nm or less may be obtained by the substrate reaction method, and carbon nanotubes having an average diameter of more than 30 nm and 110 nm or less may be obtained by the floating reaction method.

The diameters of the carbon nanotubes may be regulated by, for example, the sizes of the metal-containing particles and a reaction time. The nitrogen adsorption specific surface area of the carbon nanotubes having an average diameter of 5 nm or more and 30 nm or less may be 10 m$^2$/g or more and 500 m$^2$/g or less. Further, the nitrogen adsorption specific surface area may be 100 m$^2$/g or more and 350 m$^2$/g or less, and in particular, may be 150 m$^2$/g or more and 300 m$^2$/g or less.

A-2. Polyamide

The polyamide may be an aromatic polyamide. The polyamide in the reverse osmosis membrane is a crosslinked body.

The aromatic polyamide contains an aromatic amine component. The aromatic polyamide may be a wholly aromatic polyamide. The aromatic amine is preferably at least one aromatic polyfunctional amine selected from the group consisting of m-phenylenediamine, p-phenylenediamine, 1,3,5-triaminobenzene, 1,2,4-triaminobenzene, 3,5-diaminobenzoic acid, 2,4-diaminotoluene, 2,4-diaminoanisole, amidole, xylylenediamine, N-methyl-m-phenylenediamine, and N-methyl-p-phenylenediamine. The aromatic polyfunctional amines may be used alone or in combination thereof.

The crosslinked aromatic polyamide may have a functional group selected from the group consisting of COO, $NH_4^+$, and COOH.

The reverse osmosis membrane may contain a molecularly-oriented crosslinked aromatic polyamide configured to cover the carbon nanotubes. The crosslinked aromatic polyamide forms the crosslinked aromatic polyamide layer 112 configured to cover the surface of the carbon nanotube 110 as illustrated in FIG. 4. At least the crosslinked aromatic polyamide layer 112 adjacent to the surface of the carbon nanotube 110 is molecularly oriented in the layer. The molecular orientation refers to the alignment of the fine crystal or polymer chain of the crosslinked aromatic polyamide in a certain direction, and in this description, also includes a polyamide showing a tendency of molecular orientation. The molecular orientation may be confirmed by, for example, an electron diffraction method in a transmission electron microscope. When a halo pattern appears as a result of the electron diffraction method, no molecular orientation occurs. When the molecular orientation occurs, the halo pattern is separated to provide a non-annular pattern, and when the molecular orientation is significant, a spot appears. In this description, such a polyamide that its halo pattern obtained by the electron diffraction method is separated to show a non-annular pattern is also regarded as being molecularly oriented.

In FIG. 4, the diameter of the carbon nanotube 110 is represented by D1 and the thickness of the crosslinked aromatic polyamide layer 112 is represented by D2. The molecularly-oriented crosslinked aromatic polyamide layer 112 may have a thickness D2 of 1 nm or more and 50 nm or less on the surface of the carbon nanotube 110. The crosslinked aromatic polyamide layer 112 may be molecularly oriented as a result of a π-π interaction between a π-electron of the carbon nanotube 110 and a π-electron of the crosslinked aromatic polyamide. The crosslinked aromatic polyamide layer 112 adhering to the periphery of the carbon nanotube 110 has high resistance to washing with an aqueous solution containing oxidizing chlorine.

A-3. Porous Support

The porous support 102 illustrated in FIG. 1 is arranged for imparting mechanical strength to the reverse osmosis membrane 104. The porous support 102 may be substantially free of any separation performance.

The porous support 102 has fine pores over a range from its front surface to its rear surface. Polysulfone, cellulose acetate, polyvinyl chloride, polyacrylonitrile, polyphenylene sulfide, or polyphenylene sulfide sulfone may be used as the porous support 102. The polysulfone is suitable for the porous support 102 because of its high chemical, mechanical, and thermal stabilities.

A-4. Permeate Flux and NaCl Rejection Rate

The reverse osmosis composite membrane can maintain a high permeate flux and a high NaCl rejection rate even after washing with an aqueous solution containing oxidizing chlorine. This is because the crosslinked aromatic polyamide of the reverse osmosis membrane is hardly damaged by the washing with the aqueous solution containing oxidizing chlorine, and hence a crosslinked aromatic polyamide layer present around a carbon nanotube hardly falls from the surface of the carbon nanotube.

It is probably because the reverse osmosis membrane includes the three-dimensional structure that the carbon nanotubes form in a disentangled state and through the crosslinked aromatic polyamide that the reverse osmosis membrane maintains a high NaCl rejection rate even after the washing with the aqueous solution containing oxidizing chlorine. In addition, it is also probably because the reverse osmosis membrane contains the molecularly-oriented crosslinked aromatic polyamide configured to cover the carbon nanotubes.

The reverse osmosis composite membrane may have a permeate flux of 0.8 m$^3$/(m$^2$·day·MPa) or more and a NaCl rejection rate of 95% or more when an aqueous solution of NaCl having a pH of 7, a temperature of 23° C., and a concentration of 2,000 ppm is supplied at an operating pressure of 1.55 MPa, and may have a NaCl rejection rate of 95% or more and 99.9% or less. The permeate flux and NaCl rejection rate of the reverse osmosis composite membrane may be measured with, for example, a cross-flow test cell apparatus having an effective area of 140 cm$^2$ (TOSC Co., Ltd., SEPA CFII).

The reverse osmosis composite membrane may have a reduction rate of the NaCl rejection rate of less than 10% after having been immersed in an aqueous solution of sodium hypochlorite having a pH of 9±0.5, a temperature of 23° C., and a concentration of 200 ppm for 24 hours, and may have a reduction rate of the NaCl rejection rate of 0% or more and less than 10%.

In addition, a reduction rate $R_r$ (%) of the NaCl rejection rate is the rate at which a NaCl rejection rate $R_2$ after chlorine washing reduces relative to a NaCl rejection rate $R_1$ before the chlorine washing, and may be obtained by the equation "$R_r=100 \cdot (R_1-R_2)/R_1$." When the reduction rate of the NaCl rejection rate $R_2$ is less than 10%, the deterioration of the reverse osmosis membrane may be suppressed.

A-5. Antifouling Property

The crosslinked aromatic polyamide is molecularly oriented, and the carbon nanotubes are in a disentangled state and form the three-dimensional structure, and hence the reverse osmosis composite membrane may have a reduction rate of its permeate flux of 10% or more and less than 40% after having been brought into contact with an aqueous solution containing bovine serum albumin at a concentration of 200 ppm for 72 hours, and may have a reduction rate of 10% or more and less than 35%.

The reverse osmosis composite membrane may be used by being incorporated into, for example, a spiral, tubular, or plate-and-frame module, or being incorporated into such module after hollow yarns have been bundled.

B. Method of Manufacturing Reverse Osmosis Composite Membrane

A method of manufacturing a reverse osmosis composite membrane according to one embodiment of the present invention is a method of manufacturing a reverse osmosis composite membrane including: bringing a mixed liquid containing carbon nanotubes, water, and an amine component into contact with a porous support; and then subjecting the amine component in the mixed liquid adhering to the porous support to a crosslinking reaction, in which the mixed liquid containing the carbon nanotubes, the water, and the amine component is produced through a step of pressurizing an aqueous solution containing the carbon nanotubes while flowing the aqueous solution, followed by the reduction of the pressure to mix the carbon nanotubes.

The step of obtaining the mixed liquid may include, for example, a step of mixing a first aqueous solution containing the amine component and a second aqueous solution containing disentangled carbon nanotubes to provide a third aqueous solution containing the amine component and the carbon nanotubes.

B-1. Step of Obtaining Third Aqueous Solution

The first aqueous solution contains water and the amine component. At least one kind may be selected from the aromatic amines described in the A-2 as the amine component.

The second aqueous solution contains water and the carbon nanotubes. In the second aqueous solution, the carbon nanotubes can be present while being uniformly dispersed in the entirety of the aqueous solution in a disentangled state. The second aqueous solution is obtained from a first mixing step and a second mixing step.

In the first mixing step, a predetermined amount of the water and the carbon nanotubes loaded into a container may be stirred manually or may be stirred with a known stirrer. An aqueous solution obtained in the first mixing step is in a state in which the carbon nanotubes are distributed alone in a particulate manner in the water. Carbon nanotubes used in a related-art reverse osmosis membrane are stirred with an ultrasonic stirrer or the like. Accordingly, their agglomerate is present as subdivided agglomerates in an aqueous solution, and is not disentangled. After the first mixing step, the subsequent second mixing step is performed on the aqueous solution.

The second mixing step includes a step of pressurizing the aqueous solution containing the carbon nanotubes obtained in the first mixing step, while flowing the aqueous solution, to compress the aqueous solution, followed by the release or reduction of the pressure of the aqueous solution to return the volume of the aqueous solution to its original volume. The second mixing step is repeatedly performed a plurality of times. For example, a triple roll may be used in the second mixing step. A roll nip between the respective rolls may be set to 0.001 mm or more and 0.01 mm or less. Although the triple roll is used here, the number of rolls is not particularly limited, and a plurality of rolls, such as a twin roll, may be used, and in the case, the aqueous solution may be kneaded at the same roll nip.

In the second mixing step, a speed ratio between the rolls may be 1.2 or more and 9.0 or less, and may be 3.0 or more and less than 9.0. This is because as the speed ratio between the rolls increases, a shear force on the aqueous solution enlarges to act as a force for separating the carbon nanotubes. The phrase "speed ratio between the rolls" as used herein refers to a speed ratio between adjacent rolls.

In the second mixing step, the peripheral speed of each roll may be 0.1 m/s or more and 2.0 m/s or less, and may be 0.1 m/s or more and 1.5 m/s or less. This is because as the peripheral speed of each roll increases, even the aqueous solution can be kneaded by utilizing elasticity. The phrase "peripheral speed of each roll" as used herein refers to the speed of the surface of the roll.

The aqueous solution supplied to the rolls enters an extremely narrow nip between the rolls. The aqueous solution is pressurized while being flowed by the speed ratio between the rolls, and a predetermined volume thereof is sequentially supplied to the nip and compressed at the nip so that the volume may reduce. After that, once the aqueous solution passes the nip, its pressure is released or reduced, and hence its volume is returned to the original volume. Then, in association with the return of the volume, the carbon nanotubes largely flow and agglomerated carbon nanotubes disentangle. When the series of steps is repeatedly performed a plurality of times, the disentanglement of the carbon nanotubes in the aqueous solution advances and hence the second aqueous solution can be obtained. The second mixing step may be performed for, for example, 3 minutes or more and 10 minutes or less. For example, when the series of steps is counted as one time, the second mixing step may be performed 10 times or more and 30 times or less.

In addition, the second mixing step may be performed while the temperature of the aqueous solution obtained in the first mixing step is set within the range of from 0° C. or more to 60° C. or less. Further, the second mixing step may be performed while the temperature of the aqueous solution obtained in the first mixing step is set within the range of from 15° C. or more to 50° C. or less. The second mixing step is preferably performed at as low temperature as possible because the step is performed by utilizing the bulk modulus of water. The bulk modulus is in a proportional relationship with a Young's modulus, and is the reciprocal of a compressibility. This is because the Young's modulus reduces with increasing temperature and the compressibility increases with increasing temperature, and hence the bulk modulus also reduces with increasing temperature. Therefore, the temperature of the aqueous solution may be set to 60° C. or less, and may be set to 50° C. or less. From the viewpoint of productivity, the temperature of the aqueous solution may be set to 00° C. or more, and may be 15° C. or more. This is because when the temperature of a roll is low, a problem with, for example, dew condensation in the roll occurs.

The second mixing step is not limited to the kneading with rolls, such as the triple roll, and any other method may be adopted as long as the method is a kneading method by which the volume of the aqueous solution can be returned after having been compressed. For example, there may be used a dispersion apparatus configured to: pressurize the aqueous solution, while flowing the aqueous solution, to compress the aqueous solution to cause cavitation or turbulence; and then abruptly reduce the pressure.

By virtue of a shear force obtained in the second mixing step, a high shear force acts on the water, and the agglomerated carbon nanotubes are repeatedly passed through the rolls to be separated from each other gradually, disentangled, and dispersed in the aqueous solution, and hence the dispersibility and dispersion stability (difficulty with which the carbon nanotubes agglomerate again) of the carbon nanotubes are excellent.

In addition, the second aqueous solution may further contain a surfactant for maintaining a state in which the carbon nanotubes are disentangled. Examples of the surfactant include ionic surfactants and nonionic surfactants. Examples of the ionic surfactants include: anionic surfactants, such as sulfuric acid ester-type, phosphoric acid ester-type, and sulfone acid-type surfactants; cationic surfactants, such as a quaternary ammonium salt-type surfactant; and amphoteric surfactants, such as alkyl betaine-type, amide betaine-type, and amine oxide-type surfactants. Further, examples of the nonionic surfactants include fatty acid esters and sorbitan fatty acid esters.

The third aqueous solution may be obtained by mixing the first aqueous solution and the second aqueous solution containing the disentangled carbon nanotubes. The content of the aromatic amine in the third aqueous solution is adjusted to 1.0 mass % or more and 3.0 mass % or less, and the content of the carbon nanotubes therein is adjusted to 0.11 mass % or more and 1.3 mass % or less. The content of the aromatic amine in the third aqueous solution is preferably set within the range because of the following reasons: when the content is less than 1.0 mass %, a crosslink density is not sufficient and hence a salt rejection rate is hardly obtained; and when the content is more than 3.0 mass %, the amount of an unreacted residual amine increases and hence concern about its elution from the membrane grows. In addition, the content of the carbon nanotubes in the third aqueous solution is preferably set within the range because of the following reasons: when the content is less than 0.11 mass %, a three-dimensional structure is not formed in the entirety of the polyamide and hence chlorine resistance is hardly obtained; and when the content is more than 1.3 mass %, the peeling of a crosslinked aromatic polyamide membrane from the porous support is liable to occur.

B-2. Step of Obtaining Reverse Osmosis Composite Membrane

A step of obtaining the reverse osmosis composite membrane involves: bringing the third aqueous solution obtained as described above into contact with the porous support; and then subjecting the aromatic amine in the third aqueous solution adhering to the porous support to the crosslinking reaction.

The third aqueous solution is brought into contact with the porous support by applying the solution to the support to impregnate the support with the solution. After that, a solution containing a crosslinking agent is further applied onto the third aqueous solution, and a heat treatment is performed to cause a polycondensation reaction at an interface between both the solutions so that the aromatic amine may be crosslinked to form a reverse osmosis membrane. Thus, the reverse osmosis composite membrane described in the "A. Reverse Osmosis Composite Membrane" can be produced.

For example, an organic solvent solution containing an acid chloride component, such as trimesoyl chloride, terephthaloyl chloride, isophthaloyl chloride, or biphenyldicarboxylic acid chloride, may be used as the crosslinking agent.

Examples of the applications of the reverse osmosis composite membrane include a treatment prior to the desalination of seawater or brine, a sterilization treatment process for food-washing water, and a pretreatment sterilization process for industrial water or domestic water because its reverse osmosis membrane has excellent chlorine resistance. Further examples of the applications of the reverse osmosis composite membrane include a food industry wastewater treatment, an industrial process wastewater treatment, and a RO pretreatment for activated sludge-treated water because the reverse osmosis membrane is excellent in antifouling property.

In the present invention, part of its construction may be omitted, or the respective embodiments or modification examples may be combined to the extent that features and effects described in the present application are maintained.

The present invention includes substantially the same construction as the construction described in the embodiments (a construction having the same functions, methods, and results, or a construction having the same object and effects). In addition, the present invention includes a construction obtained by replacing an unessential portion of the construction described in the embodiments. In addition, the present invention includes a construction exhibiting the same action and effect as those of the construction described in the embodiments, or a construction that can achieve the same object as that of the foregoing construction. In addition, the present invention includes a construction obtained by adding a known technology to the construction described in the embodiments.

EXAMPLES

Examples of the present invention are described below, but the present invention is not limited thereto.
(1) Production of Sample of Example 1
(1-1) Production of Porous Support An N,N-dimethylformamide solution containing 13 mass % of polysulfone (hereinafter referred to as "liquid A") and an N,N-dimethylformamide solution containing 20 mass % of polysulfone (hereinafter referred to as "liquid B") were each prepared by holding the mixture of the solvent and the solute under heating at 90° C. for 2 hours while stirring the mixture.

The respective prepared liquids were each cooled to room temperature, and were supplied to separate extruders to be subjected to high-precision filtration. After that, the respective filtered liquids were simultaneously cast onto a long-fiber nonwoven fabric formed of polyethylene terephthalate fibers (yarn diameter: 1 decitex, thickness: about 90 μm, air permeability: 1.3 cc/cm$^2$/sec) through a double slit die so that the liquid A had a thickness of 110 μm and the liquid B had a thickness of 90 μm. 2.8 Seconds after the casting, the resultant was immersed in pure water and washed for 5 minutes. Thus, a porous support was obtained.
(1-2) Production of Third Aqueous Solution 488 g of a first aqueous solution obtained by adding 478 g of distilled water to 10 g of m-phenylenediamine, and stirring and mixing the contents with a magnetic stirrer, and 12 g of a second aqueous solution containing disentangled carbon nanotubes were stirred and mixed with a magnetic stirrer to provide 500 g of a third aqueous solution containing 2.0 mass % of m-phenylenediamine and 0.4 mass % of the carbon nanotubes.

Here, the second aqueous solution is produced through a step of pressurizing an aqueous solution containing the carbon nanotubes while flowing the aqueous solution, followed by the reduction of the pressure to uniformly mix the carbon nanotubes. Specifically, the second aqueous solution was obtained by: stirring 10 g of distilled water and 2 g of multi-walled carbon nanotubes (Nanocyl-7000 manufactured by Nanocyl, average diameter: 10 nm (the average diameter was a value obtained by arithmetically averaging values measured at 200 or more sites through the use of an image photographed with a scanning electron microscope)) with respect to pure water manually (first mixing step); and then loading the mixture into a triple roll having a roll diameter of 50 mm (EXAKT M-50 I manufactured by Nagase Screen Printing Research Co., Ltd.) (roll temperature: 25° C. or more and 40° C. or less), followed by kneading for 3 minutes or more and 10 minutes or less (second mixing step). A roll nip was 0.001 mm or more and less than 0.01 mm, roll speed ratios V1, V2, and V3 were 1, 1.8, and 3.3, respectively, and the roll speed V3 was 1.2 m/s in terms of a peripheral speed.

(1-3) Production of Reverse Osmosis Composite Membrane

The porous support having an area of 400 cm$^2$ was immersed in the third aqueous solution for 2 minutes, and was then slowly lifted so that a support surface became vertical. Nitrogen was blown from an air nozzle against the support to remove an excess aqueous solution from its surface, and then 50 ml of a n-hexane solution at 25° C. containing 0.1 mass % of trimesoyl chloride was applied so that the support surface was completely wet. After the resultant had been left at rest for 1 minute, in order for an excess solution to be removed from the porous support, liquid draining was performed by vertically holding the support surface for 1 minute. After that, the porous support was washed with water at 45° C. for 2 minutes. Thus, a reverse osmosis composite membrane of Example 1 was obtained.

(1-4) Measurement of Carbon Nanotube Content

SII EXSTAR 6000 THERMAL ANALYZER TG/DTA6200 was used in the measurement of the content of the carbon nanotubes in a reverse osmosis membrane. The reverse osmosis composite membrane was sampled in an alumina pan, and was evaluated for its carbon nanotube content at a rate of temperature increase of 10° C./min under an air atmosphere by utilizing a difference in thermal decomposition starting temperature between the polyamide and the carbon nanotubes. The reverse osmosis membrane of Example 1 contained 15.5 mass % of the carbon nanotubes.

(2) Production of Sample of Example 2

A sample of Example 2 was produced in the same manner as in Example 1 except the step of producing the third aqueous solution of the (1-2). In Example 2, 491 g of a first aqueous solution obtained by adding 481 g of distilled water to 10 g of m-phenylenediamine, and stirring and mixing the contents with a magnetic stirrer, and 9 g of a second aqueous solution containing disentangled carbon nanotubes (the second aqueous solution was identical to that of Example 1) were stirred and mixed with a magnetic stirrer to provide 500 g of a third aqueous solution containing 2.0 mass % of m-phenylenediamine and 0.3 mass % of the carbon nanotubes.

The carbon nanotube content of the sample of Example 2 was measured in the same manner as in the (1-4). The reverse osmosis membrane of Example 2 contained 12.5 mass % of the carbon nanotubes.

(3) Production of Sample of Example 3

A sample of Example 3 was produced in the same manner as in Example 1 except the step of producing the third aqueous solution of the (1-2). In Example 3, 486.5 g of a first aqueous solution obtained by adding 476.5 g of distilled water to 10 g of m-phenylenediamine, and stirring and mixing the contents with a magnetic stirrer, and 13.5 g of a second aqueous solution containing disentangled carbon nanotubes (the second aqueous solution was identical to that of Example 1) were stirred and mixed with a magnetic stirrer to provide 500 g of a third aqueous solution containing 2.0 mass % of m-phenylenediamine and 0.45 mass % of the carbon nanotubes.

The carbon nanotube content of the sample of Example 3 was measured in the same manner as in the (1-4). The reverse osmosis membrane of Example 3 contained 17.5 mass % of the carbon nanotubes.

(4) Production of Sample of Example 4

A sample of Example 4 was produced in the same manner as in Example 1 except the step of producing the third aqueous solution of the (1-2). In Example 4, 485 g of a first aqueous solution obtained by adding 475 g of distilled water to 10 g of m-phenylenediamine, and stirring and mixing the contents with a magnetic stirrer, and 15 g of a second aqueous solution containing disentangled carbon nanotubes (the second aqueous solution was identical to that of Example 1) were stirred and mixed with a magnetic stirrer to provide 500 g of a third aqueous solution containing 2.0 mass % of m-phenylenediamine and 0.5 mass % of the carbon nanotubes.

The carbon nanotube content of the sample of Example 4 was measured in the same manner as in the (1-4). The reverse osmosis membrane of Example 4 contained 20.0 mass % of the carbon nanotubes.

(5) Production of Sample of Example 5

A sample of Example 5 was produced in the same manner as in Example 1 except the step of producing the third aqueous solution of the (1-2). In Example 5, 496.7 g of a first aqueous solution obtained by adding 486.7 g of distilled water to 10 g of m-phenylenediamine, and stirring and mixing the contents with a magnetic stirrer, and 3.3 g of a second aqueous solution containing disentangled carbon nanotubes (the second aqueous solution was identical to that of Example 1) were stirred and mixed with a magnetic stirrer to provide 500 g of a third aqueous solution containing 2.0 mass % of m-phenylenediamine and 0.11 mass % of the carbon nanotubes.

The carbon nanotube content of the sample of Example 5 was measured in the same manner as in the (1-4). The reverse osmosis membrane of Example 5 contained 5.0 mass % of the carbon nanotubes.

(6) Production of Sample of Example 6

A sample of Example 6 was produced in the same manner as in Example 1 except the step of producing the third aqueous solution of the (1-2). In Example 6, 494 g of a first aqueous solution obtained by adding 484 g of distilled water to 10 g of m-phenylenediamine, and stirring and mixing the contents with a magnetic stirrer, and 6 g of a second aqueous solution containing disentangled carbon nanotubes (the second aqueous solution was identical to that of Example 1) were stirred and mixed with a magnetic stirrer to provide 500 g of a third aqueous solution containing 2.0 mass % of m-phenylenediamine and 0.2 mass % of the carbon nanotubes.

The carbon nanotube content of the sample of Example 6 was measured in the same manner as in the (1-4). The reverse osmosis membrane of Example 6 contained 9.0 mass % of the carbon nanotubes.

(7) Measurement of Permeate Flux and NaCl Rejection Rate

An aqueous solution of NaCl having a pH of 7, a temperature of 23° C., and a concentration of 2,000 ppm was supplied to each of the reverse osmosis composite membranes of Examples 1 to 6 with a cross-flow test cell apparatus (TOSC Co., Ltd., SEPA CFII) at an operating pressure of 1.55 MPa, and a filtration treatment was performed over 4 hours. The electric conductivities of the supplied water and permeated water obtained by the filtration treatment were measured with an electric conductivity meter (ES-71) manufactured by HORIBA, Ltd. to provide a practical salinity. A NaCl rejection rate (%) was determined from a NaCl concentration obtained by converting the practical salinity by using the following equation.

NaCl rejection rate (%)=100×{1−(NaCl concentration in permeated water/NaCl concentration in supplied water)}

In addition, the amount of the permeated water obtained by 24 hours of the filtration treatment was converted into a water permeability ($m^3$) per an area of the membrane surface of 1 $m^2$, per 1 day, and per an operating pressure of 1 MPa, and was determined as a permeate flux ($m^3/(m^2 \cdot day \cdot MPa)$).

Figure 5:
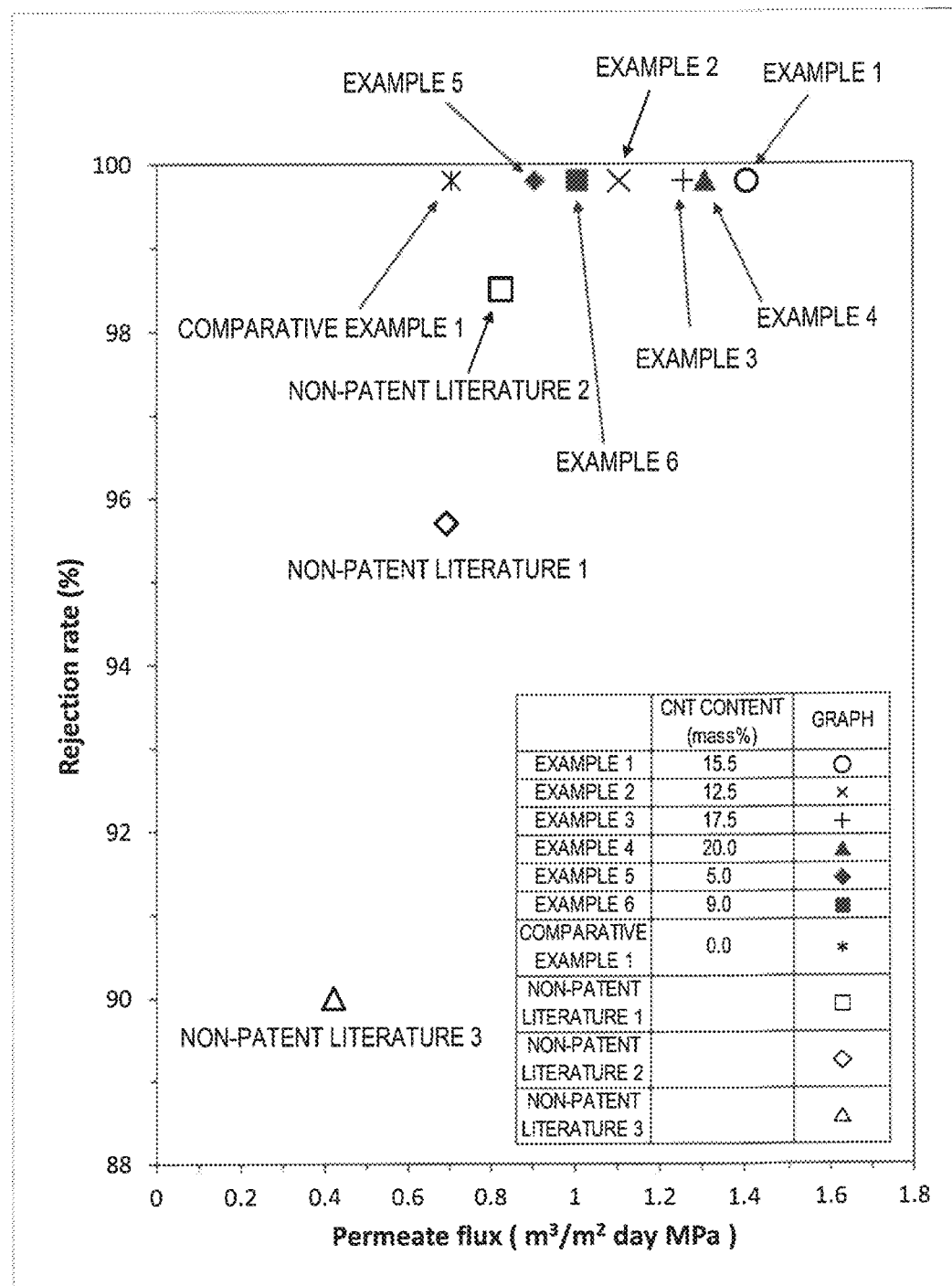
FIG. 5 is a permeate flux-NaCl rejection rate graph.

The results are shown in Table 1 and the graph of FIG. 5. In FIG. 5, an axis of abscissa indicates the permeate flux ($m^3/(m^2 \cdot day \cdot MPa)$) and an axis of ordinate indicates the NaCl rejection rate (%).

As comparative examples, a reverse osmosis composite membrane formed only of polyamide (Comparative Example 1) manufactured at the same polyamide concentration (no carbon nanotubes) as that of the above-mentioned third aqueous solution, and the reverse osmosis composite membranes of Non Patent Literatures 1 and 2 were subjected to the measurement under the same conditions. The measured values are shown in Table 1 and FIG. 5. In FIG. 5, a point represented by an unfilled circle corresponds to the measured values of Example 1, a point represented by an asterisk corresponds to the measured values of Comparative Example 1, a point represented by an unfilled diamond corresponds to the measured values of Non Patent Literature 1 (Kim et al.), a point represented by an unfilled square corresponds to the measured values of Non Patent Literature 2 (Lee et al.), and a point represented by an unfilled triangle corresponds to the measured values of Non Patent Literature 3 (Zhao et al.).

TABLE 1

| | CNT content (mass %) | NaCl rejection rate (%) | Permeate flux ($m^3/m^2 d\ MPa$) |
|---|---|---|---|
| Example 1 | 15.5 | 99.8 | 1.4 |
| Example 2 | 12.5 | 99.8 | 1.1 |
| Example 3 | 17.5 | 99.8 | 1.25 |
| Example 4 | 20.0 | 99.8 | 1.3 |
| Example 5 | 5.0 | 99.8 | 0.9 |
| Example 6 | 9.0 | 99.8 | 1.0 |
| Comparative Example 1 | 0.0 | 99.8 | 0.7 |
| Non Patent Literature 1 | | 98.5 | 0.69 |
| Non Patent Literature 2 | | 95.7 | 0.82 |
| Non Patent Literature 3 | | 90.0 | 0.42 |

(8) Chlorine Resistance

Each of the reverse osmosis composite membranes of Examples 1 to 6 and the commercial reverse osmosis composite membrane used in the (7) was immersed in an aqueous solution of sodium hypochlorite having a pH of 9±0.5, a temperature of 23° C., and a concentration of 200 ppm for 24 hours, and then its permeate flux and NaCl rejection rate were measured in the same manner as in the (7). Changes in NaCl rejection rate and permeate flux calculated by using the measurement results from the expression "100×(measured value after immersion)/(measured value before immersion)" are illustrated in FIG. 6.

Figure 6:
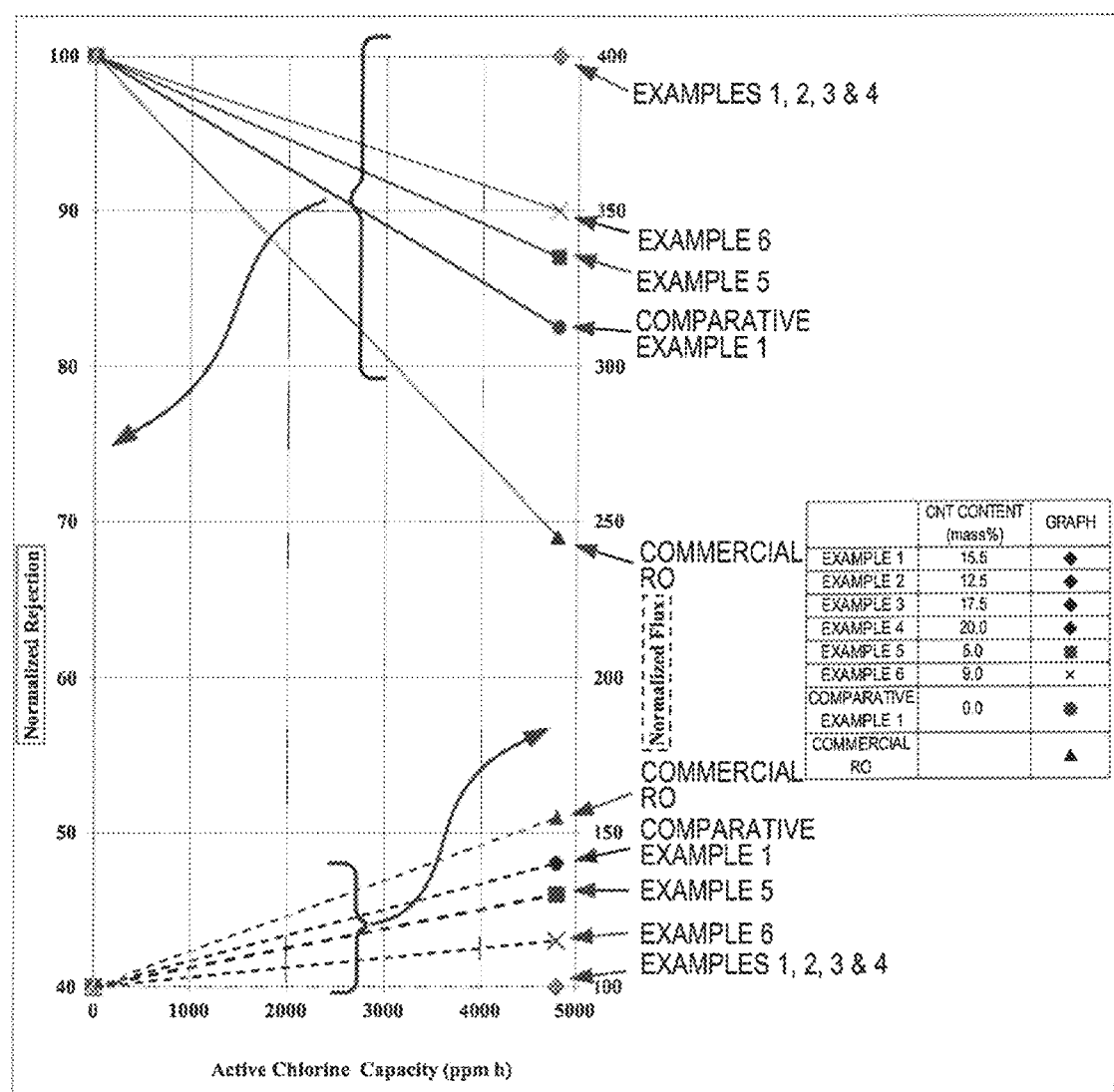
FIG. 6 is a graph of a NaCl rejection rate and a permeate flux against the product of a chlorine concentration and an immersion time.

In FIG. 6, an axis of abscissa indicates the product of a chlorine concentration and an immersion time (active chlorine capacity (ppm·h)), a left axis of ordinate indicates the NaCl rejection rate (the measured values are represented by solid lines) (normalized rejection), and a right axis of ordinate indicates the permeate flux (the measured values are represented by broken lines) (normalized flux). In FIG. 6, a point represented by a filled diamond corresponds to each of Examples 1 to 4, a point represented by a filled square corresponds to Example 5, a point represented by × corresponds to Example 6, a point represented by a filled circle corresponds to Comparative Example 1, and a point represented by a filled triangle corresponds to a commercial product (a commercial RO membrane PMHA (product name) manufactured by Toray Industries, Inc.). The respective measurement results are normalized while the NaCl rejection rate and the permeate flux at the time of the initiation of the measurement (0 ppm·h) are each defined as 100%.

Each of the reverse osmosis composite membranes of Examples 1 to 4 showed no changes in permeate flux and NaCl rejection rate during a time period from the initiation of the measurement (0 ppm·h) to the completion of the measurement 24 hours after the initiation (4,800 ppm·h), and hence the increase rate of the permeate flux remained at 0% and the reduction rate of the NaCl rejection rate also remained at 0%.

In addition, as can be seen from the results of the (7), the reverse osmosis composite membrane of Example 1 had a permeate flux and a NaCl rejection rate higher than those of the reverse osmosis composite membranes of Non Patent Literatures 1 to 3, though the membrane was inferior in permeate flux to the commercial reverse osmosis composite membrane. It is probably because the carbon nanotubes were not disentangled and hence the carbon nanotubes were in an agglomerated fine particle state that the NaCl rejection rate of each of the reverse osmosis composite membranes of Non Patent Literatures 1 to 3 was low.

In addition, as can be seen from the results of the (8), each of the reverse osmosis composite membranes of Examples 1 to 4 was excellent in chlorine resistance, and was able to maintain its NaCl rejection rate and permeate flux before the washing with chlorine even after the washing. Each of the reverse osmosis composite membranes of Examples 5 and 6 was superior in chlorine resistance to the reverse osmosis composite membrane of Comparative Example 1 and the commercial product, and was able to suppress its NaCl rejection rate before the washing with chlorine from reducing after the washing and to suppress its permeate flux before the washing from increasing after the washing.

(9) Electron Microscope Observation

Figure 7:
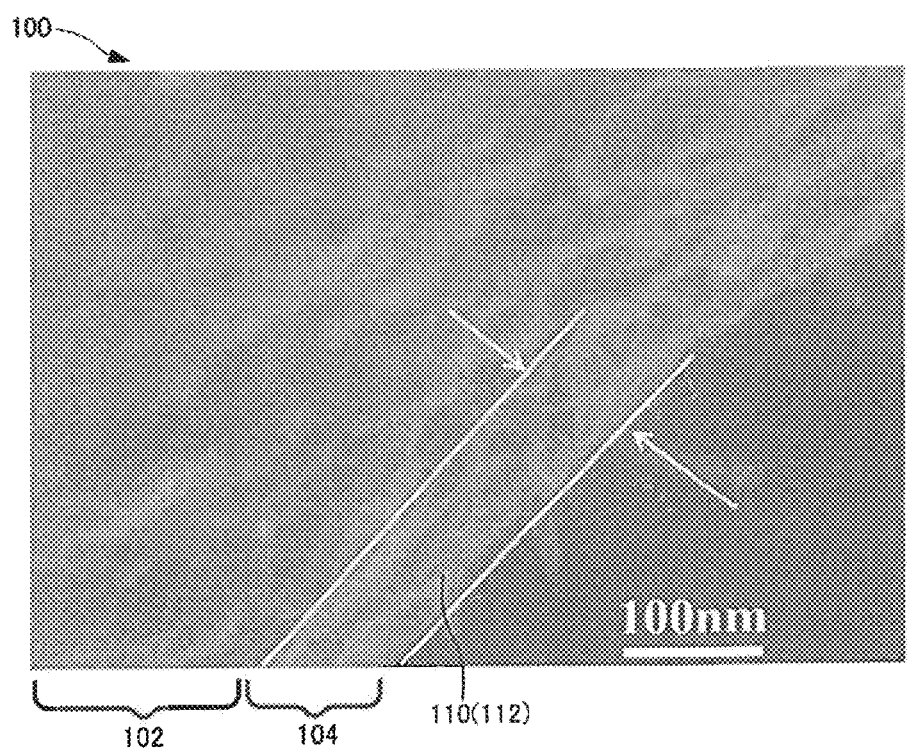
FIG. 7 is a photograph of a torn surface of the reverse osmosis composite membrane 100 of Example 1 obtained with a scanning electron microscope.

FIG. 7 is a photograph of a torn surface of the reverse osmosis composite membrane 100 of Example 1 obtained with a scanning electron microscope. The surface of the porous support 102 was covered with the reverse osmosis membrane 104. The thickness of the reverse osmosis membrane 104 was about 100 nm. As illustrated in FIG. 7, the three-dimensional structure of the carbon nanotubes 110 was able to be observed in the reverse osmosis membrane 104. Specifically, the carbon nanotubes 110 had a continuous network structure (through the crosslinked aromatic polyamide layers 112 covering the carbon nanotubes 110) in a torn surface. In addition, when the surface of the reverse osmosis membrane of Example 1 was observed with a scanning electron microscope, no agglomerate of the carbon nanotubes was found.

Figure 8:
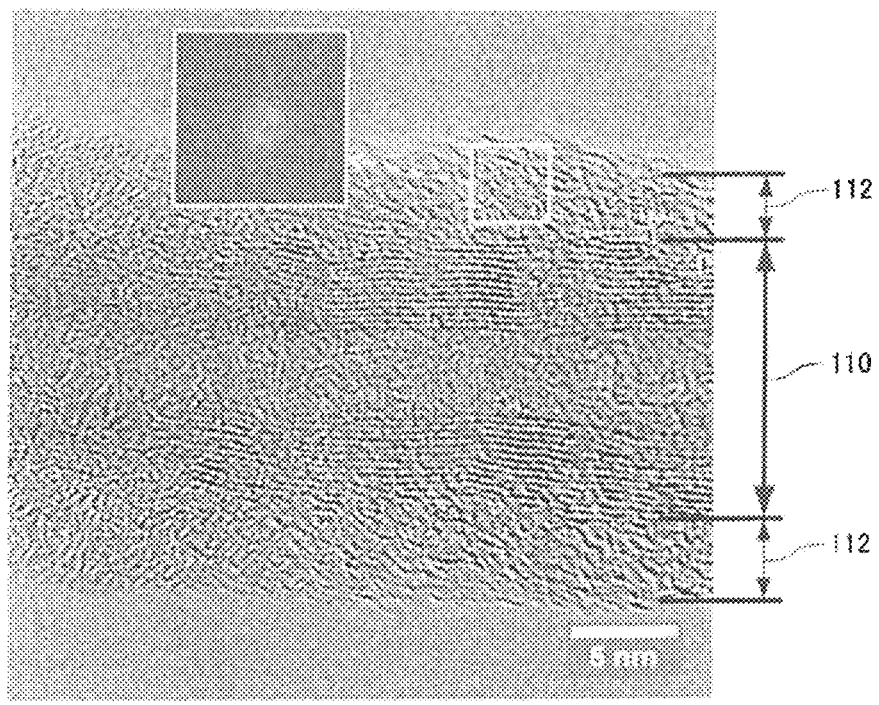
FIG. 8 is a photograph of the carbon nanotube 110 of the reverse osmosis composite membrane 100 of Example 1 obtained with a transmission electron microscope.

FIG. 8 is a photograph of the carbon nanotube 110 of the reverse osmosis composite membrane 100 of Example 1 obtained with a transmission electron microscope. The carbon nanotube 110 extended in the left and right directions of the figure, and the crosslinked aromatic polyamide layer 112 was formed around (above and below) the carbon nanotube 110. A photograph obtained by subjecting the crosslinked aromatic polyamide layer 112 to electron diffraction analysis is shown in a portion surrounded by a white frame. The crosslinked aromatic polyamide layer 112 was molecularly oriented. The crosslinked aromatic polyamide layer 112 may be molecularly oriented as a result of a π-π interaction between a π-electron of the carbon nanotube 110 and a π-electron of the crosslinked aromatic polyamide. In addition, according to FIG. 8, the surface of the carbon nanotube 110 forming the three-dimensional structure was covered with the crosslinked aromatic polyamide layer 112 having a thickness of about 5 nm.

Figure 9:
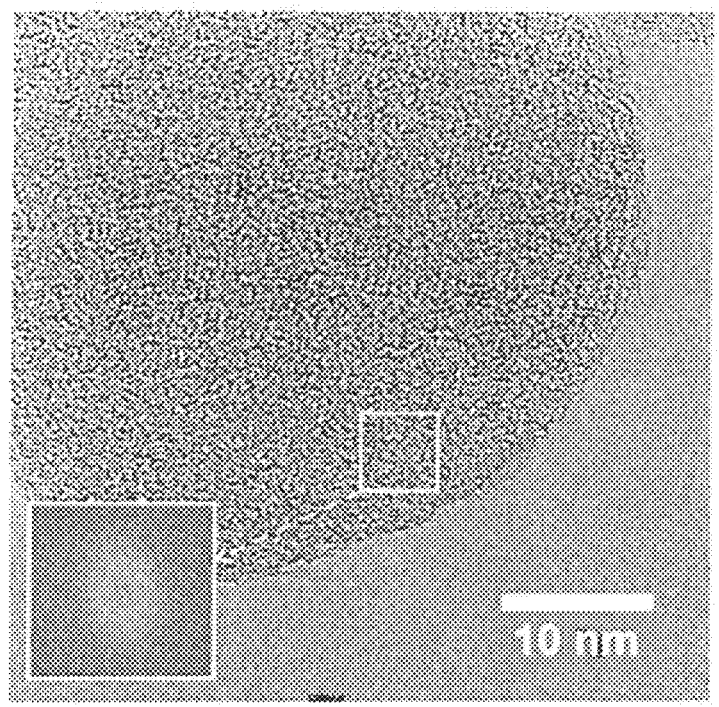
FIG. 9 is a transmission electron microscope photograph of a crosslinked aromatic polyamide in a reverse osmosis membrane free of any carbon nanotube.

In addition, for comparison, a transmission electron microscope photograph of the crosslinked aromatic polyamide in Comparative Example 1 serving as the reverse osmosis membrane free of any carbon nanotube is illustrated in FIG. 9. A portion surrounded by a white frame is a result of electron diffraction analysis and the crosslinked aromatic polyamide was not molecularly oriented.

Closest distances between the carbon nanotubes were measured for the sample of Example 1. The results are illustrated in FIG. 3. A thin film-like test piece in which the surface of the reverse osmosis membrane was turned into a smooth surface was cut out through cutting along the surface of the reverse osmosis composite membrane of Example 1 by a cryo-microtome method, and the smooth surface (reverse osmosis membrane) of the test piece was observed with a scanning electron microscope. A plurality of observation points (points along the vicinity of the central axis of a fiber) were prepared for each of the carbon nanotubes in a scanning electron microscope image, and a distance between observation points at positions closest to each other in the observation points of adjacent carbon nanotubes was measured as a closest distance. FIG. 3 is a graph in which the measurement results are plotted as filled triangle marks against an axis of abscissa indicating the closest distance (nm) and an axis of ordinate indicating the number of measurement points (frequency). A measurement area and the number of measurement points in the test piece were 441 μm² and 20,000, respectively.

As illustrated in FIG. 3, the graph showing the frequency of the closest distance showed the following normal distribution: the distribution had a peak (around 60 nm) within the range of the thickness (100 nm) of the reverse osmosis membrane, and the half-width (60 nm) of the peak was equal to or less than the thickness (100 nm) of the reverse osmosis membrane.

(10) Production and Observation of Sample of Comparative Example 2

In Comparative Example 2, 477.6 g of distilled water and 0.4 g of sodium dodecyl sulfate serving as a surfactant were added to 2.0 g of carbon nanotubes, and the contents were mixed and stirred with a magnetic stirrer for 30 minutes. The solution was subjected to an ultrasonic treatment in an ultrasonic treatment bath for 6 hours to provide a second aqueous solution. 10 g of m-phenylenediamine was added to the second aqueous solution after the ultrasonic treatment, and the contents were stirred and mixed with a magnetic stirrer to provide 500 g of a third aqueous solution containing 2.0 mass % of m-phenylenediamine, 0.4 mass % of the carbon nanotubes, and 0.08 mass % of the surfactant. A reverse osmosis composite membrane sample of Comparative Example 2 was produced in the same manner as in Example 1 except the step of producing the third aqueous solution.

A permeate flux and a NaCl rejection rate were measured by using the sample of Comparative Example 2 in the same manner as in the (7). The sample of Comparative Example 2 had a permeate flux of 8.3 m³/(m²·day·MPa) and a NaCl rejection rate of 25%.

Figure 10:
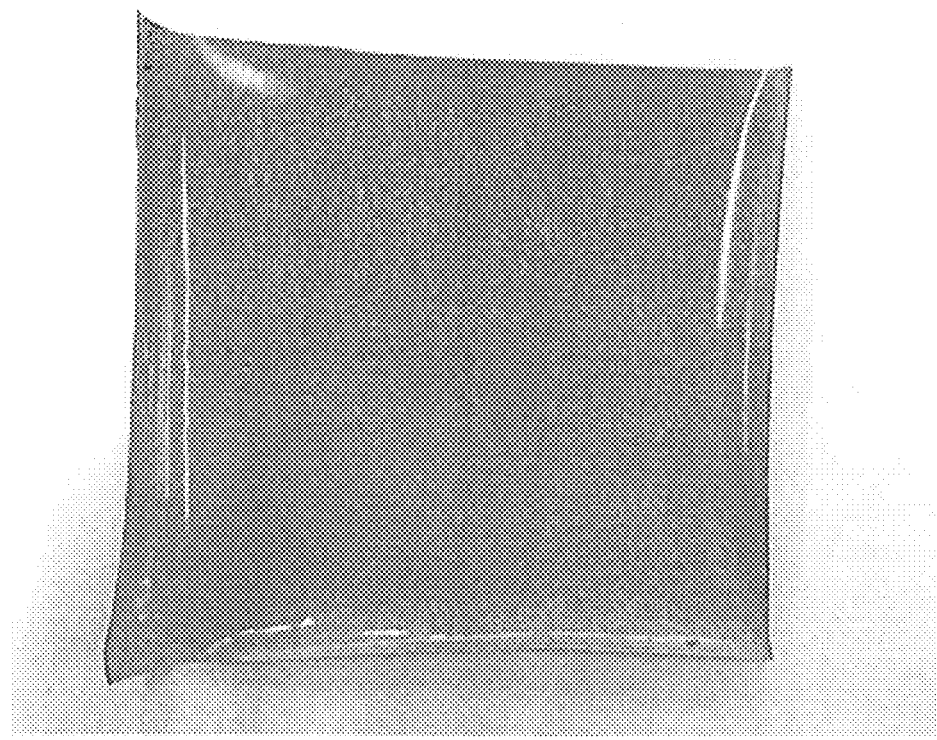
FIG. 10 is a photograph of a reverse osmosis composite membrane of Comparative Example 2.
Figure 11:
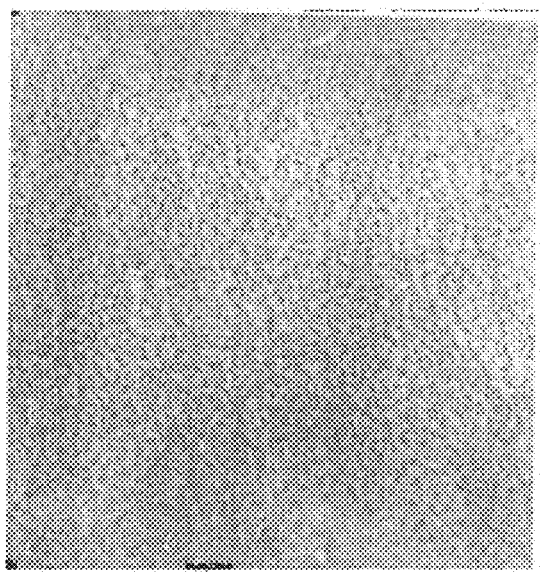
FIG. 11 is a photograph obtained by enlarging part of FIG. 10.

FIG. 10 is a photograph obtained by photographing the entirety of the sample (200 mm×200 mm) of Comparative Example 2, and FIG. 11 is a photograph obtained by enlarging part of FIG. 10. Many small black points in FIG. 11 are agglomerates of the carbon nanotubes and were able to be visually observed.

Closest distances between the carbon nanotubes were measured for the sample of Comparative Example 2 in the same manner as in Example 1, and a graph was created by plotting the results as filled circle marks in FIG. 3. As illustrated in FIG. 3, a peak showing a normal distribution was not obtained within the range of the thickness of the reverse osmosis membrane despite the fact that Example 1 and Comparative Example 2 contained the same amount of the carbon nanotubes. No closest distances were measured for the carbon nanotubes in each of the agglomerates.

The reverse osmosis composite membrane of Comparative Example 2 was increased in permeate flux and reduced in NaCl rejection rate probably because the carbon nanotube agglomerate portions passed the aqueous solution without rejecting NaCl. Substantially no crosslinked polyamide membranes may be formed in the agglomerate portions. It was found that unless the carbon nanotubes were disentangled, the reverse osmosis composite membrane could not function as a reverse osmosis membrane.

(11) Antifouling Property

A permeate flux when each of the reverse osmosis composite membranes of Example 1 and Comparative Example 1, and the commercial reverse osmosis composite membrane was brought into contact with an aqueous solution containing bovine serum albumin at a concentration of 200 ppm for 96 hours was measured. A change rate with time when a permeate flux at the time of the initiation of the measurement (0 h) is defined as 100% is illustrated in FIG. 12.

Figure 12:
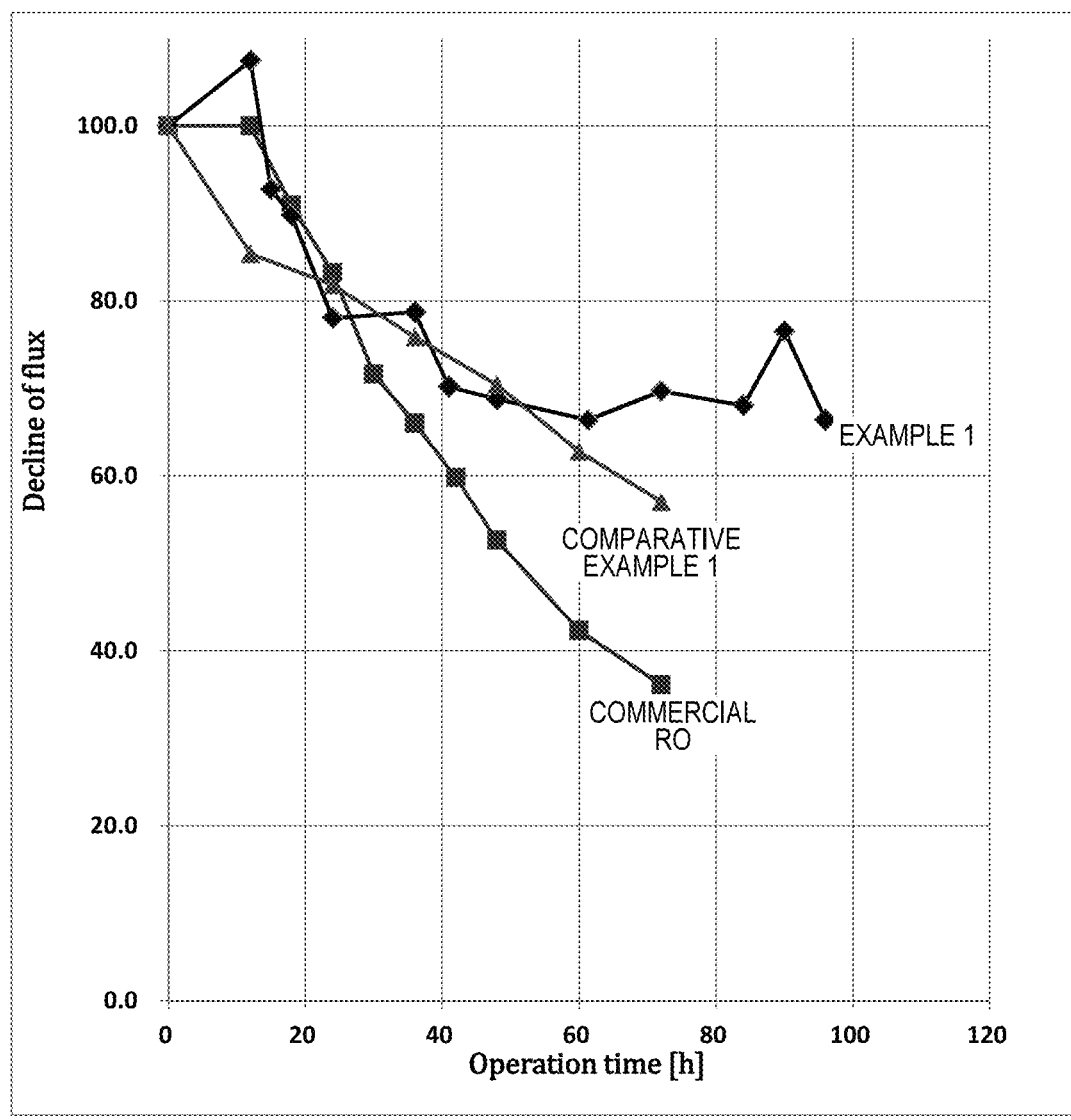
FIG. 12 is a graph for illustrating a change in permeate flux when a reverse osmosis composite membrane is brought into contact with an aqueous solution containing bovine serum albumin at a concentration of 200 ppm for 96 hours.

In FIG. 12, points represented by filled diamonds correspond to the measured values of the change rate of the permeate flux of Example 1, points represented by filled triangles correspond to the measured values of the change rate of the permeate flux of Comparative Example 1, and points represented by filled squares correspond to the measured values of the change rate of the permeate flux of the commercial product.

The reverse osmosis composite membrane of Example 1 was excellent in antifouling property because its permeate flux showed a small change about 20 hours after the initiation of the measurement and remained substantially unchanged about 40 hours after the initiation, and the change rate of the permeate flux 72 hours after the initiation was less than 35%.

REFERENCE SIGNS LIST

100: Reverse osmosis composite membrane, 102: Porous support, 104: Reverse osmosis membrane, 110: Carbon nanotube, 112: Crosslinked aromatic polyamide layer, 120: Crosslinked aromatic polyamide

The invention claimed is:

1. A method of manufacturing a reverse osmosis composite membrane, comprising:
    pressurizing and compressing an aqueous solution containing carbon nanotubes and water while flowing the aqueous solution, followed by releasing or reducing a pressure to return a volume of the aqueous solution to an original volume to mix the carbon nanotubes to produce a mixture;
    mixing the mixture with an amine component to form a mixed liquid, wherein the mixed liquid consists of water, the amine component, the carbon nanotubes, and optionally a surfactant;
    bringing the mixed liquid into contact with a porous support so that the amine component in the mixed liquid adheres to the porous support; and
    then subjecting the amine component in the mixed liquid adhering to the porous support to a crosslinking reaction.

2. The method of manufacturing a reverse osmosis composite membrane according to claim 1,
    wherein a content of the amine component in the mixed liquid is 1.0 mass % or more and 3.0 mass % or less; and
    wherein a content of the carbon nanotubes in the mixed liquid is 0.11 mass % or more and 1.3 mass % or less.

3. The method of manufacturing a reverse osmosis composite membrane according to claim 1, wherein the amine component is an aromatic amine.

4. The method of manufacturing a reverse osmosis composite membrane according to claim 1, wherein the aqueous solution containing the carbon nanotubes further contains the surfactant.

5. The method of manufacturing a reverse osmosis composite membrane according to claim 1, wherein in the step of pressurizing and compressing, the aqueous solution is pressured and compressed by passing the aqueous solution between a nip of a plurality of rolls.

6. The method of manufacturing a reverse osmosis composite membrane according to claim 5, wherein the plurality of rolls is a triple roll.

7. The method of manufacturing a reverse osmosis composite membrane according to claim 6, wherein the plurality of rolls have a roll nip of 0.001 mm or more and less than 0.01 mm.

8. The method of manufacturing a reverse osmosis composite membrane according to claim 6, wherein a peripheral speed of each roll is 0.1 m/s or more and 2.0 m/s or less.

9. The method of manufacturing a reverse osmosis composite membrane according to claim 8, wherein the peripheral speed of each roll is 0.1 m/s or more and 1.5 m/s or less.

10. The method of manufacturing a reverse osmosis composite membrane according to claim 9, wherein the roll speed ratio is 1.2 or more and 3.3 or less.

* * * * *